United States Patent Office 3,713,965
Patented Jan. 30, 1973

3,713,965
NON-BLOCKING PACKAGING FILM COMPRISING AN ETHYLENE-VINYL ACETATE COPOLYMER BLENDED WITH A FATTY ACID AMIDE AND CALCIUM CARBONATE
Almar T. Widiger, Midland, and Marvin J. Kreh, Essexville, Mich., assignors to The Dow Chemical Company, Midland, Mich.
No Drawing. Filed Dec. 28, 1970, Ser. No. 102,084
Int. Cl. B32b 27/08, 27/18
U.S. Cl. 161—254
6 Claims

ABSTRACT OF THE DISCLOSURE

A packaging film particularly suited for the shrink-packaging of oxygen-sensitive materials, said film consisting essentially of a first layer of a normally crystalline vinylidene chloride-vinyl chloride copolymer and a second layer of a specified copolymer of ethylene and vinyl acetate having blended therewith at least 1 percent by weight calcium carbonate and at least 3 percent by weight of a fatty acid amide.

BACKGROUND

It is known to prepare plastic film laminates by coextrusion of a normally crystalline vinylidene chloride-vinyl chloride polymer with a second plastic material, e.g., polyethylene as disclosed by Canadian Pat. 713,477, wherein the coextruded structures may be easily delaminated.

It is desirable, however, to prepare delamination resistant plastic film laminates by coextrusion of a first layer of a normally crystalline vinylidene chloride-vinyl chloride polymer with a second layer of a plastic material such as an ethylene-unsaturated ester type copolymer, wherein such structures are resistant to embrittlement at low temperatures and particularly wherein such laminates are substantially non-blocking under normal conditions of fabrication and use and which, in addition, are sufficiently self-sealing, e.g., when subjected to a hot water shrink bath. Heretofore, film laminates prepared from a first layer of a normally crystalline vinylidene chloride-vinyl chloride copolymer and a second layer of an ethylene unsaturated ester type copolymer either block excessively during normal storage and shipping conditions, i.e., when subjected to temperatures of up to about 140° F.; or fail to self-seal at temperatures encountered in a hot water shrink bath, i.e., temperatures of about 160° F.

It is the primary object of the present invention to prepare delamination resistant film laminates based on a first layer of a normally crystalline vinylidene chloride-vinyl chloride copolymer, and a second layer of an ethylene-unsaturated ester type copolymer which are substantially non-blocking up to temperatures of about 140° F. and are sufficiently self-sealing during normal film shrinking techniques.

SUMMARY

The above advantages are obtained from a two-layered thermoplastic, coextruded, heat-shrinkable packaging film consisting essentially of a first layer of a normally crystalline vinylidene chloride-vinyl chloride copolymer and a second layer of a copolymer of from about 72 to 83 percent by weight ethylene and from about 17 to 28 percent by weight vinyl acetate, said copolymer having a melt index of from about 2 to 20 and preferably between about 2 and 6; and having blended therewith at least 1 percent by weight calcium carbonate and at least 3 percent by weight of a fatty acid amide of the formula:

R CONH$_2$ wherein R is alkyl having from 10 to about 22 carbon atoms.

DESCRIPTION OF THE PREFERRED EMBODIMENTS

Typical of the normally crystalline vinylidene chloride-vinyl chloride copolymers useful in the present invention are the materials containing between about 70 and 80 percent by weight of vinylidene chloride and between about 20 and 30 percent by weight of vinyl chloride. It is to be understood that such copolymers may contain small amounts of one or more other monoethylenically unsaturated comonomers, in interpolymerized form, exemplary of which are vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropane, among others.

The ethylene-vinyl acetate copolymers utilized are copolymers of from about 72 to 83 percent by weight ethylene and from about 17 to 28 percent by weight vinyl acetate, wherein such copolymers have a melt index of between about 2 and 20 and preferably between about 2 and 6. Exemplary of such materials are copolymers of between about 72 and 73 percent by weight ethylene and from about 27 to 28 percent by weight vinyl acetate having a melt index of from about 5 to 6; and copolymers of from about 81 to 83 percent by weight ethylene and from about 17 and 19 percent by weight vinyl acetate having a melt index of from 2 to about 20.

As indicated previously, the fatty acid amide used is any material of the formula:

R CONH$_2$ wherein R is alkyl having from 10 to about 22 carbon atoms, with such alkyl groups being saturated or unsaturated. As purely exemplary of such materials are: palmitamide, stearamide, oleamide, behenamide and eruclamide and suitable mixtures thereof.

When preparing the ethylene-vinyl acetate copolymer composition used herein, it is important that a thorough and complete intimate mixing of the ethylene-vinyl acetate copolymer with the calcium carbonate and the fatty acid amide is obtained. This is best accomplished by blending the materials while they are in a solid, powdered or pulverant form, although any suitable means may be utilized.

In the extrusion of the vinylidene chloride-vinyl chloride copolymers, it is frequently advantageous and beneficial to incorporate therein a minor portion of a plasticizer and oftentimes a heat stabilizer and/or a light stabilizer such as tertiary butyl salol. Such additives are well known in the art and generally are found advantageous in that the temperature required for the extrusion is substantially reduced and the probability of decomposition of the polymer in the extruder is lowered. Typical plasticizers which are employed in the vinylidene chloride-vinyl chloride copolymers are acetyl tributyl citrate, epoxidized soybean oil (commercially available under the trade designation of Paraplex G–60) and dibutyl sebacate.

The plastic film laminates of this invention may be prepared by coextruding the normally crystalline vinylidene chloride-vinyl chloride copolymer and the ethylene-unsaturated ester type copolymer composition, as a tube. The coextrudate is then placed substantially immediately in one or more tempering baths, usually maintained at a temperature of from about 5° C. to 50° C. to chill and to provide a proper blow temperature for the coextrudate. The tube is subsequently blown into a bubble to orient the molecules of the plastic, especially the vinylidene chloride-vinyl chloride copolymer molecules which are the main components enabling bubble orientation. The laminate may then be rolled onto a wind-up roll, or subsequently processed. Subsequent processing may involve lamination to paper, plastic, or metal with the ethylene-vinyl acetate copolymer ply acting as the adhesive.

It may also involve vacuum drawing of the film. The laminate may also be used in the packaging process known as "form, fill and seal," because it is heat sealable. In fact, it is heat sealable at a much lower temperature (160° F.) and the seal is strong. This favorably compares to the very weak seal of Saran over a narrower range (260° to 280° F.). The resultant film of this invention may also be pre-labeled by a "trap label" process wherein a continuous array of individual labels may be trapped between two layers of the laminate with the ethylene-vinyl acetate copolymer ply of each being adhered together. The resulting label laminate may then be formed and sealed using either high frequency or usual heat sealing methods, depending on the layer structure.

Additional layers may also be coextruded along with the above mentioned copolymers to effect a variation in the desired characteristics in the film.

The following example further illustrates the present invention and its advantages. Unless otherwise specified all parts and percentages are by weight.

EXAMPLE

In each of a series of experiments individual film bag structures were prepared by extrusion of the hereinafter identified polymer constituents through a diehead containing two annular slits wherein the normally crystalline vinylidene chloride-vinyl chloride copolymer constituent was introduced directly from an extruder through a flow slit designed without a slit feed manifold (to avoid prolonged exposure of such polymer to high temperatures) whereas the ethylene-vinyl acetate copolymer composition was introduced directly from an extruder through a flow slit containing a slit feed manifold. The individual annular slits in the diehead blend into a singular annular exit slit from which the laminate material exuded as a tube or sock. The sock was then run through a cooling bath maintained at a temperature of from about 5° C. to 25° C. to supercool the plastic being extruded. Squeeze rolls were then used to flatten the sock into a flat form.

The flattened tube was then passed over guide-squeeze rolls into a heating bath maintained at a temperature of from about 20° C. to 50° C. to temper the flattened tube prior to expansion and orientation thereof. The tempered tube was then passed through bubble seal rolls and expanded into a plastic bubble via superatmospheric pressure injected into the tube in the conventional manner; whereby expansion of the tube results in orientation of the molecules of the plastic.

After expansion, the tube was flattened by passing it through a series of converging rollers and pinch rolls and the tube wound on conventional wind-up rolls.

Individual film bags were then obtained from the roll stock and each bag evaluated for blocking and self-sealing characteristics following exposure to evaluated temperatures.

In all instances, the vinylidene chloride-vinyl chloride copolymer used was composed of about 90 percent by weight of a copolymer of 73 percent by weight vinylidene chloride and 27 percent by weight vinyl chloride containing about 10 percent by weight of the plasticizer dibutyl sebacate and small amounts of magnesium oxide.

The following Table I sets forth the thickness of such vinylidene chloride-vinyl chloride film layer (hereinafter referred to as the "external" layer), and the thickness and composition of the ethylene-vinyl acetate film layer (hereinafter referred to as the "internal" layer).

TABLE I.—COMPOSITION OF FILM LAMINATES

| | External layer thickness (gauge) | Internal layer | | | | |
|---|---|---|---|---|---|---|
| Sample designation | | Thickness (gauge) | Percent vinyl acetate in copolymer | M.I. | Percent CaCO$_3$ | Percent stearamide |
| For comparison: | | | | | | |
| 1 | [1] 225 | 30 | 27–28 | 6 | 1 | 1 |
| 2 | [2] 230 | 30 | 27–28 | 6 | 1 | 1 |
| 3 | 260 | 50 | 27–28 | 5 | 1 | 1 |
| 4 | 270 | 65 | 27–28 | 5 | 1 | 2 |
| 5 | 225 | 45 | 27–28 | 5 | 2 | 1 |
| 6 | 179 | 38 | 27–28 | 24 | 1 | 1 |
| The invention: | | | | | | |
| 7 | 225 | 50 | 27–28 | 5 | 1 | 3 |
| 8 | 245 | 49 | 27–28 | 6 | 1 | 3 |
| 9 | 164 | 47 | 17–19 | 20 | 1 | 3 |

[1] Also dusted internally with rice starch.
[2] Also dusted internally with talc.

The following Table II sets forth the blocking and self-sealing characteristics of each of the above film laminates.

TABLE II

| | Ft. lbs. blocking (48 hrs. exposure) | | | | | |
|---|---|---|---|---|---|---|
| | 100° F. | | 120° F. | | 140° F. | |
| Sample designation | External | Internal | External | Internal | External | Internal |
| For comparison: | | | | | | |
| 1 | 0.09 | 0.09 | 0.2 | ([1]) | 2.6 | ([2]) |
| 2 | 0.6 | 0.2 | 0.7 | ([1]) | 1.4 | ([2]) |
| 3 | 0.0 | 0.4 | 0.0 | ([1]) | 0.0 | ([2]) |
| 4 | 0.0 | 0.6 | 0.0 | ([1]) | 0.0 | ([2]) |
| 5 | 0.0 | 0.6 | 0.0 | ([1]) | 0.0 | ([2]) |
| 6 | 0.6 | 0.0 | 1.5 | ([2]) | 3.0 | ([2]) |
| The invention: | | | | | | |
| 7 | 0.0 | 0.3 | 0.0 | 0.3 | 0.0 | 0.4 |
| 8 | 0.0 | 0.0 | 0.7 | 0.0 | 0.8 | 0.13 |
| 9 | 0.5 | 0.0 | 1.5 | 0.0 | 1.2 | 0.0 |

[1] Partly sealed.
[2] Sealed.

The above data illustrate that only the film laminates herein described and claimed are substantially non-blocking, i.e., without at least a partial seal, when exposed to temperatures of up to 140° F. for extended periods of time. Further, the film laminates designated above as Sample Nos. 7, 8 and 9 provided excellent self-sealing when used as shrink-film packaging for meat wherein the film was caused to shrink by placing it in boiling water.

What is claimed is:

1. Substantially non-blocking packaging film consisting essentially of a first layer of a normally crystalline vinylidene chloride-vinyl chloride copolymer and a second layer of a copolymer of from about 72 to 83 percent by weight ethylene and from about 17 to 28 percent by weight vinyl acetate, and having a melt index of between about 2 and 20 said second layer having blended therewith at least 1 percent by weight calcium carbonate and at least 3 percent by weight of a fatty acid amide of the formula:

$$R\ CONH_2$$

wherein R is alkyl having from 10 to about 22 carbon atoms.

2. The composition of claim 1 wherein said normally crystalline vinylidene chloride-vinyl chloride copolymer is a copolymer of from about 70 to 80 percent by weight vinylidene chloride and from about 30 to 20 percent by weight vinyl chloride.

3. The composition of claim 2 wherein said normally crystalline vinylidene chloride-vinyl chloride copolymer is a copolymer of about 73 percent by weight vinylidene chloride and about 27 percent by weight vinyl chloride.

4. The composition of claim 3 wherein said fatty acid amide is stearamide.

5. The composition of claim 4 wherein said copolymer of ethylene and vinyl acetate contains from about 72 to 73 percent by weight ethylene and from about 27 to 28 percent by weight vinyl acetate and has a melt index of from about 5 to 6.

6. The composition of claim 4 wherein said copolymer of ethylene and vinyl acetate contains from about 81 to 83 percent by weight ethylene and from about 17 to 19 percent by weight vinyl acetate and has a melt index of from about 2 to 20.

References Cited
UNITED STATES PATENTS

| | | | |
|---|---|---|---|
| 3,576,649 | 4/1971 | Brazier | 206—46 F |
| 3,446,631 | 5/1969 | Samuels | 161—165 |
| 3,203,936 | 8/1965 | Breslow et al. | 260—87.3 |
| 3,445,324 | 5/1969 | Curler et al. | 161—254 |
| 3,558,330 | 1/1971 | Widiger et al. | 161—254 |
| 3,505,259 | 4/1970 | Hallis, Jr. | 260—87.3 |
| 3,547,754 | 12/1970 | Tokos et al. | 229—3.5 R |
| 3,232,789 | 2/1966 | Pelzek et al. | 117—138.8 |
| 3,467,568 | 9/1969 | Williams, Jr. | 161—165 |

DANIEL J. FRITSCH, Primary Examiner

U.S. Cl. X.R.

161—256; 206—46 F; 264—171